United States Patent
Wooters

(10) Patent No.: US 6,239,363 B1
(45) Date of Patent: May 29, 2001

(54) VARIABLE BUOYANCY CABLE

(75) Inventor: Timothy M. Wooters, West Columbia, TX (US)

(73) Assignee: Marine Innovations, L.L.C., Richmond, TX (US)

( * ) Notice: Subject to any disclaimer, the term of this patent is extended or adjusted under 35 U.S.C. 154(b) by 0 days.

(21) Appl. No.: 09/286,868

(22) Filed: Apr. 6, 1999

Related U.S. Application Data

(63) Continuation-in-part of application No. 08/898,526, filed on Jul. 22, 1997, now abandoned, which is a continuation-in-part of application No. 08/536,421, filed on Sep. 29, 1995, now abandoned.

(51) Int. Cl.$^7$ .............................. F16L 11/12; H01B 7/00
(52) U.S. Cl. ................... 174/47; 174/100 R; 174/113 C; 174/116; 138/110; 138/113
(58) Field of Search ......................... 174/47, 15.6, 15.7, 174/19, 74 R, 113 C, 113 A, 102 R; 385/105, 110, 112, 114; 138/113

(56) References Cited

U.S. PATENT DOCUMENTS

| | | | |
|---|---|---|---|
| 3,375,324 | * | 3/1968 | Miller .............................. 174/101.5 |
| 3,517,110 | * | 6/1970 | Morgan .................................. 174/47 |
| 3,526,086 | * | 9/1970 | Morgan .................................. 57/149 |
| 3,597,779 | * | 8/1971 | Morgan ............................. 174/101.5 |
| 3,766,307 | * | 10/1973 | Andrews, Jr. .......................... 174/47 |
| 3,909,774 | * | 9/1975 | Pavey, Jr. ................................. 340/7 |
| 4,110,554 | * | 8/1978 | Moore et al. ..................... 174/101.5 |
| 4,135,141 | * | 1/1979 | Caldwell et al. ......................... 340/7 |
| 4,196,307 | * | 4/1980 | Moore et al. ........................... 174/47 |
| 4,199,653 | * | 4/1980 | Talley . |
| 4,261,671 | * | 4/1981 | Langner ............................... 405/166 |
| 4,310,718 | * | 1/1982 | Eng ........................................ 174/15 |
| 4,541,079 | * | 9/1985 | Thigpen ............................... 367/130 |
| 4,548,664 | * | 10/1985 | Canivet ................................ 156/166 |
| 4,683,944 | * | 8/1987 | Curlett ................................ 166/65.1 |
| 4,693,540 | * | 9/1987 | Cane .................................... 439/198 |
| 4,711,196 | * | 12/1987 | Wilks .................................... 114/365 |
| 4,745,238 | * | 5/1988 | Kotthaus et al. ................. 174/101.5 |
| 4,745,583 | * | 5/1988 | Motal .................................... 367/18 |
| 4,765,711 | * | 8/1988 | Obst .................................. 350/96.23 |
| 4,866,214 | * | 9/1989 | Kinnan .................................. 174/47 |
| 5,285,008 | * | 2/1994 | Sas-Jaworsky ........................ 174/47 |
| 5,362,921 | * | 11/1994 | Birkelund et al. ..................... 174/47 |
| 5,670,860 | * | 9/1997 | Conrady et al. ......................... 320/2 |
| 5,902,958 | * | 5/1999 | Haxton .................................. 174/47 |
| 5,920,032 | * | 7/1999 | Awschbacher et al. ............... 174/47 |
| 6,019,652 | | 2/2000 | Nielsen et al. ....................... 441/133 |

FOREIGN PATENT DOCUMENTS

WO 93/17176 * 9/1993 (WO) .............................. D07B/1/14

* cited by examiner

Primary Examiner—Dean A. Reichard
Assistant Examiner—William H Mayo, III
(74) Attorney, Agent, or Firm—Timothy M. Honeycutt

(57) ABSTRACT

A variable buoyancy cable is provided. In one aspect, the variable buoyancy cable includes a flexible sleeve that has an inner wall and an outer wall. A core is positioned in the sleeve and has a longitudinally disposed external channel with opposing first and second sidewalls. The channel and the inner wall of the flexible sleeve define a fluid passage for receiving a fluid to affect the buoyancy of the variable buoyancy cable. A slackened utility line is positioned in the channel and a fluid supply is coupled to the flexible sleeve and is operable to move fluid into and out of the fluid passage to selectively affect the buoyancy of the variable buoyancy cable. The core protects utility lines in the cable from damage due to ambient pressure and/or bending during deployment and retrieval. The buoyancy may be varied to suit various water conditions and mission requirements.

52 Claims, 10 Drawing Sheets

FIG. 1
(PRIOR ART)
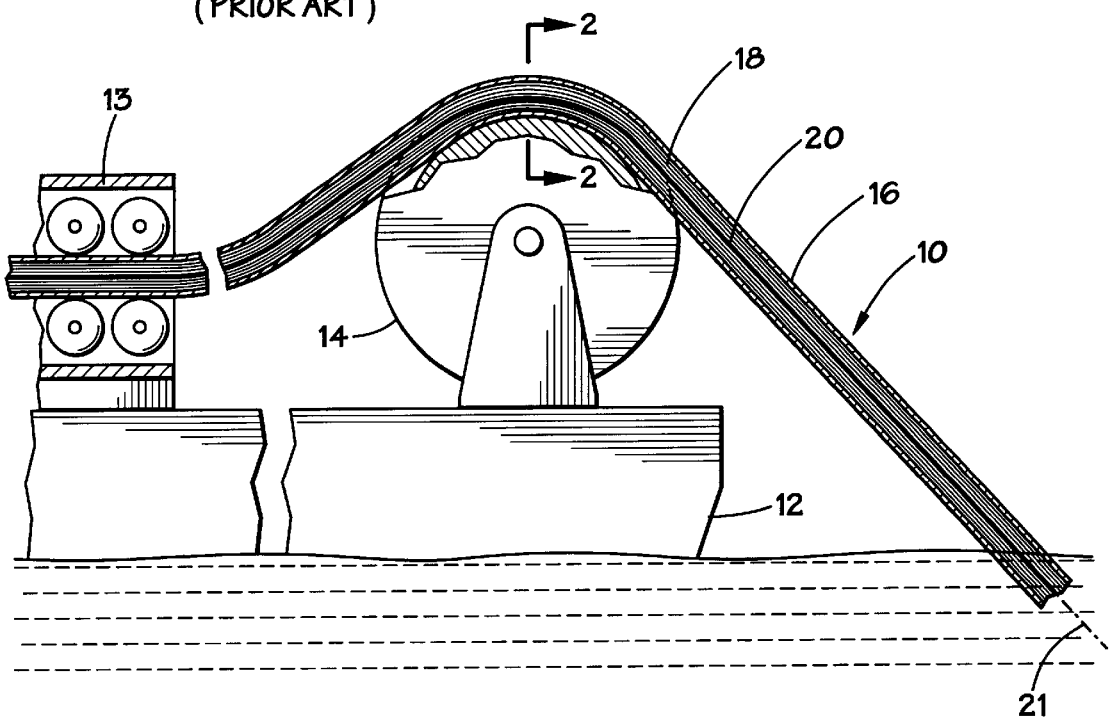
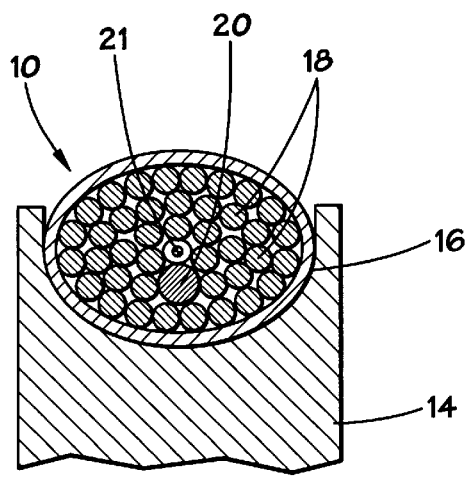
FIG. 2
(PRIOR ART)

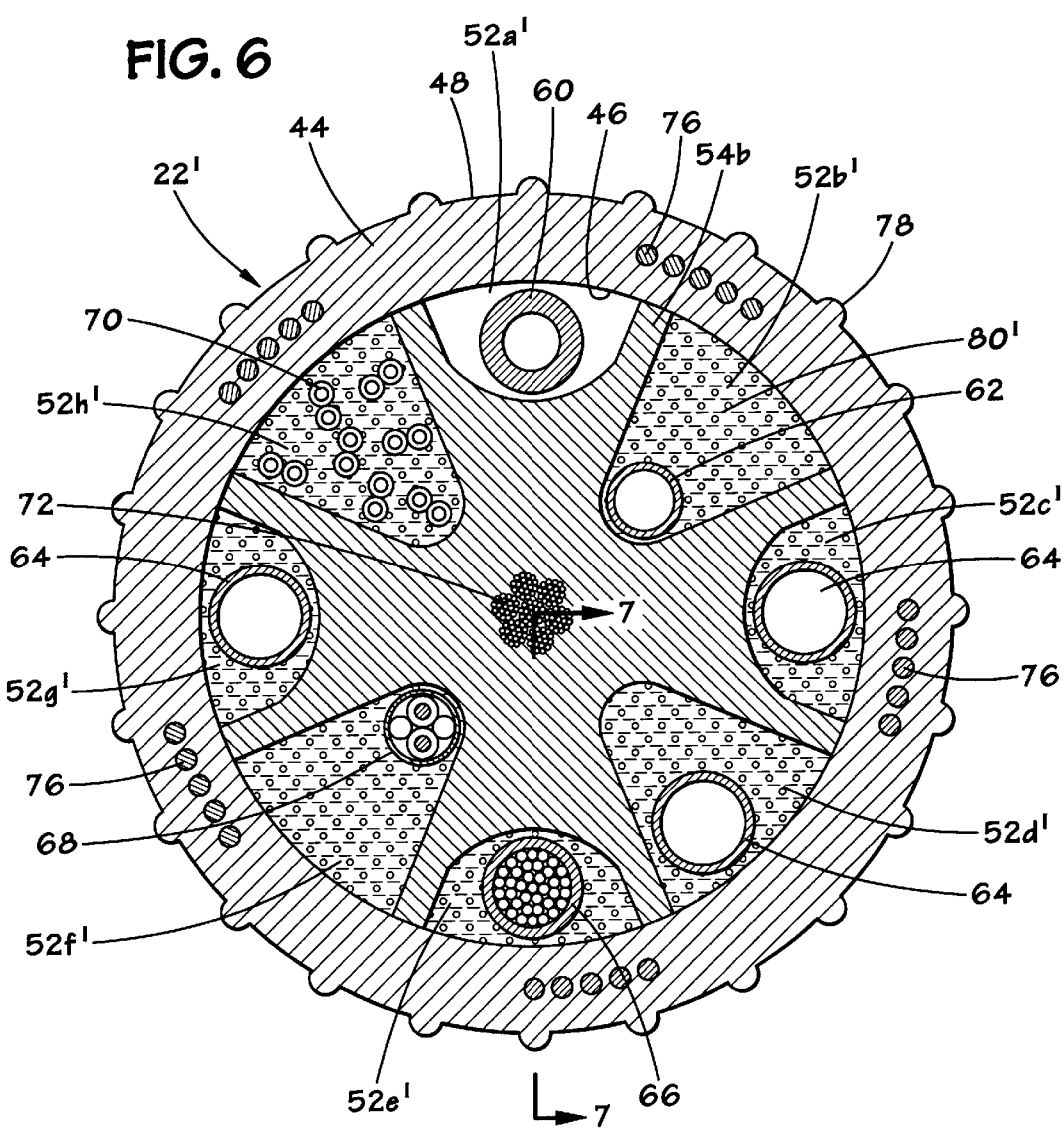
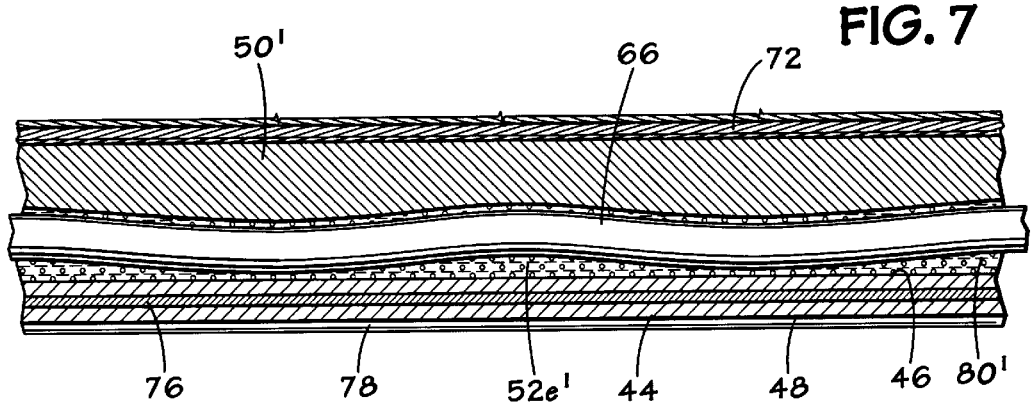

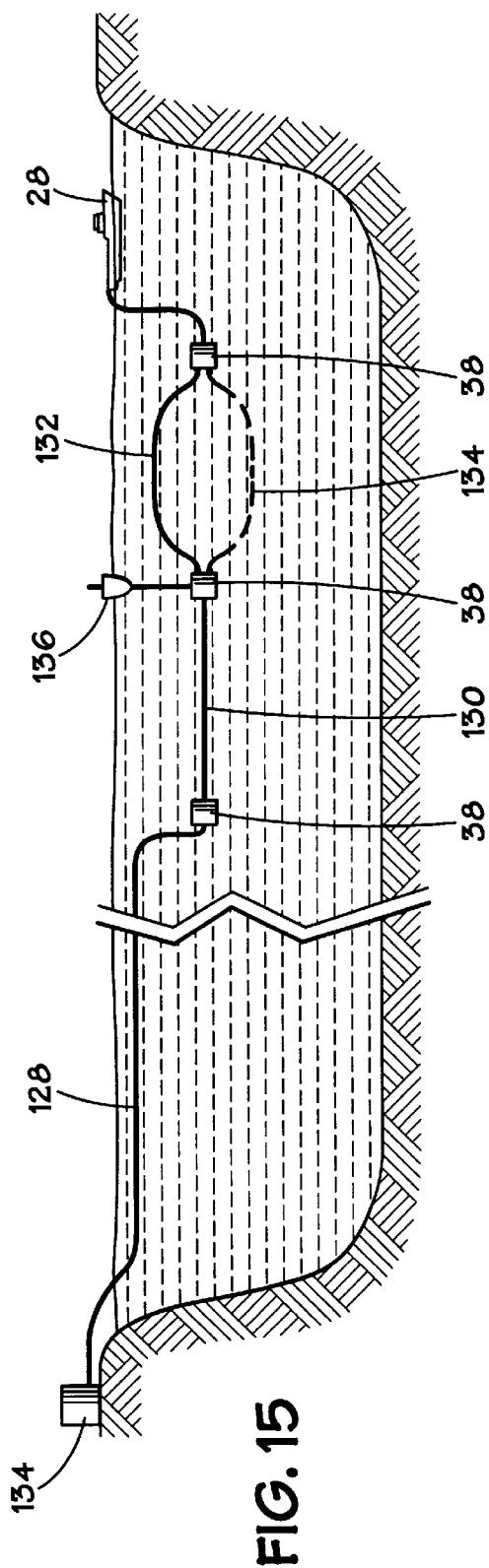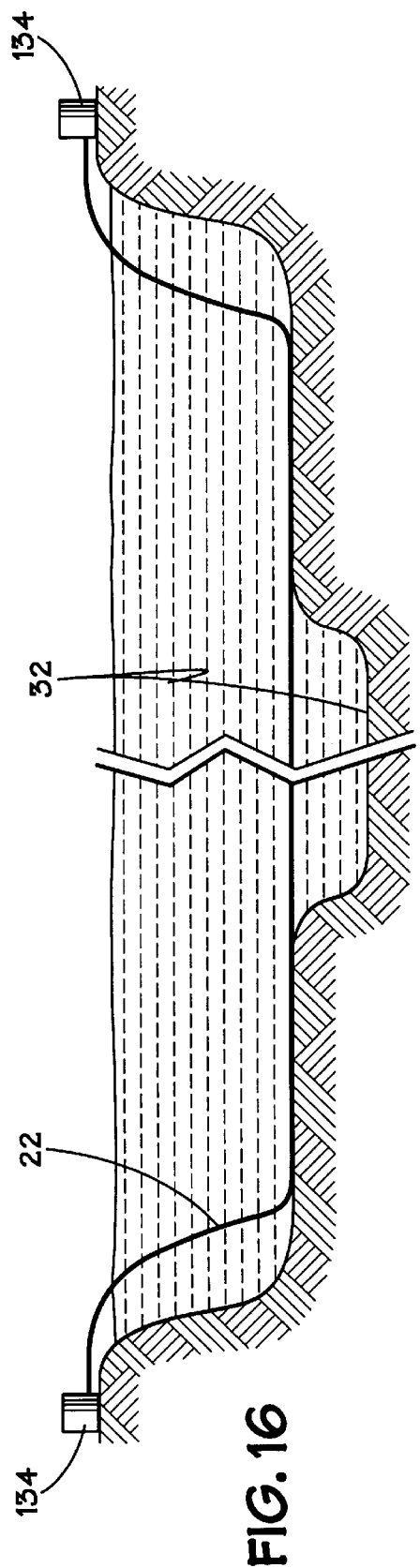

VARIABLE BUOYANCY CABLE

This is a continuation-in-part of Ser. No. 08/898,526, filed Jul. 22, 1997, abandoned which is a continuation-in-part of Ser. No. 08/536,421, filed Sep. 29, 1995, abandoned.

BACKGROUND OF THE INVENTION

1. Field of the Invention

This invention relates generally to marine seismic cables, and more particularly to a marine seismic cable with selectively controllable buoyancy.

2. Description of the Related Art

Offshore oil and gas exploration and production operations frequently involve the repeated deployment of submerged cables for transmitting data signals and electrical power between various sensors and other electronic equipment and ship or land-based receiving stations. Marine seismic operations involve the static deployment of a submerged cable on the ocean bottom, or the suspension thereof between buoys or land structures. Other typical operations involve the towing of a submerged cable or "streamer" behind a ship. Still others employ a marine cable used as a tether for a Remotely Operated Vehicle ("ROV"). Such ROV set ups are now commonly used to conduct underwater inspections of various structures, such as oil rigs and the like.

Most conventional marine seismic cables consist of a tubular outer jacket that encloses a plurality of individually insulated conducting wires and one or more tension members that are typically placed on the center axis of the cable to restrict the elongation of the cable. These types of conventional cables are fabricated to have a fixed buoyancy at a preselected depth, namely, the anticipated depth of operation for the particular undersea operation. The design neutral buoyancy depth for a given conventional marine seismic cable is based upon an assumed density of sea water. There are a number of disadvantages associated with this type of design.

The operating depth of the fixed buoyancy cable is a function of the density of the ambient water, which is a function a number of parameters, such as temperature, salinity and mineral content, to name a few. Accordingly, where the ocean conditions encountered by the conventional fixed buoyancy marine seismic cable vary from the anticipated norm, this type of cable can deviate significantly from the desired depth. Furthermore, where operational needs dictate transition to another depth, a fixed buoyancy cable may have to be retrieved to the vessel and replaced with another cable, resulting in costly down time and the expense of acquiring and stowing additional cables onboard. Another disadvantage associated with conventional fixed buoyancy marine seismic cables is the potential for the enclosed conductors to be damaged during deployment and retrieval from the cable vessel. Most conventional seismic cables are deployed from a spool or supply stack that is mounted on the cable vessel. The cable is fed from the spool or supply stack, through a linear cable engine consisting of a plurality of opposed rotating tires, and over a sheave that is typically mounted near the stem of the cable vessel. As the cable passes over the sheave, the cable undergoes significant bending and may undergo significant tensile forces, depending upon the amount of cable in the water, the vessel speed, and sea conditions. This bending in conjunction with large tensile forces can cause the elongated tension members enclosed within the cable jacket to compress some of the enclosed conductors against the portion of the cable jacket that is in contact with the sheave against each other, possibly resulting in damage to those conductors.

Some conventional marine seismic cables contemplate variable buoyancy. In one design, a pair of opposed fluid lines are positioned in an expanded sleeve around which an outer sleeve and another sleeve are concentrically disposed. The conductor wires for this cable design are positioned between the expanded sleeve and one of the two outer sleeves. The fluid lines are provided with a preset amount of an oil and are interconnected via bypass valves which open and close in response to increases in pressure of the fluid as a result of water pressure bearing against the external cable sleeve. The cable is designed to change buoyancy automatically in response to encountering variations in water density. One difficulty associated with this conventional design is the fact that the conductor wires are directly exposed to forces imparted by the compression of the external cable jacket. Furthermore, the conductor wires are positioned very close to the exterior of the cable. Thus, the wires will be subjected to a significant bending and other stresses as the cable passes over the sheave during deployment and retraction from the cable vessel. In addition, this conventional design provides only a limited capability to provide variable buoyancy to the cable.

In another conventional variable buoyancy design, a tubular external jacket is provided with a relatively spacious internal cavity in which a bundle of signal conductors are positioned along with one or more strain members and a fluid supply line. The cable is provided with a pressure sensing switch that is housed eccentrically within a block that is concentrically disposed within the outer jacket. The switch assembly includes a bellows arrangement that is longitudinally movable to activate electrical switches which open and close valves enabling fluid to flow in and out of the supply line. The bellows arrangement is exposed to the ambient sea water such that changes in pressure associated with undesired changes in depth activate the bellows arrangement so that fluid is transferred into or out of the supply line as desired. Little structure is provided in this design for protecting the various conductors from the deleterious compressive forces associated with pressure induced compression of the external jacket as well as bending over the deployment sheave on the cable vessel. Furthermore, the eccentrically disposed pressure sensing apparatus is susceptible to damage during translation over the deployment sheave.

The present invention is directed to overcoming or reducing the effects of one or more of the foregoing disadvantages.

SUMMARY OF THE INVENTION

In accordance with one aspect of the present invention, a variable buoyancy cable is provided that includes a flexible sleeve that has an inner wall and an outer wall. A core is positioned in the sleeve and has a longitudinally disposed external channel with opposing first and second sidewalls. The channel and the inner wall of the flexible sleeve define a fluid passage for receiving a fluid to affect the buoyancy of the variable buoyancy cable. A slackened utility line is positioned in the channel and a fluid supply is coupled to the flexible sleeve and is operable to move fluid into and out of the fluid passage to selectively affect the buoyancy of the variable buoyancy cable.

In accordance with another aspect of the present invention, a variable buoyancy cable is provided that includes a flexible sleeve that has an inner wall and an outer wall. A core is positioned in the sleeve and has a plurality of longitudinally disposed external channels, each of which has opposing first and second sidewalls. The plurality of channels and the inner wall of the flexible sleeve define a plurality of fluid passages for receiving a fluid to affect the buoyancy of the variable buoyancy cable. A plurality of slackened utility lines are positioned in select of the plurality of channels. A fluid supply is coupled to the flexible sleeve and is operable to move fluid into and out of the fluid passages to selectively affect the buoyancy of the variable buoyancy cable.

In accordance with another aspect of the present invention, a variable buoyancy cable is provided that includes a flexible sleeve that has an inner wall and an outer wall. A core is positioned in the sleeve and has a plurality of helical external channels, each of which has opposing first and second sidewalls. The plurality of helical channels and the inner wall of the flexible sleeve define a plurality of fluid passages for receiving a fluid to affect the buoyancy of the variable buoyancy cable. A plurality of slackened utility lines are positioned in select of the plurality of helical channels. A fluid supply is coupled to the flexible sleeve and is operable to move fluid into and out of the fluid passages to selectively affect the buoyancy of the variable buoyancy cable.

BRIEF DESCRIPTION OF THE DRAWINGS

The foregoing and other advantages of the invention will become apparent upon reading the following detailed description and upon reference to the drawings in which:

FIG. 1 is a side view of a portion of a conventional marine seismic cable deployed from a ship-mounted sheave;

FIG. 2 is a sectional view of FIG. 1 taken at section 2—2;

FIG. 6 is a sectional view like FIG. 4 of an alternate exemplary embodiment of the variable buoyancy cable in accordance with the present invention;

FIG. 7 is a sectional view of FIG. 6 taken at section 7—7 in accordance with the present invention;

FIG. 15 is a side view like FIG. 14, but depicts a multiple segment embodiment of the variable buoyancy cable in accordance with the present invention; and FIG. 16 is a side view like FIG. 15 depicting a fixed ocean-bottom-positioned embodiment of the variable buoyancy cable in accordance with the present invention.

DETAILED DESCRIPTION OF SPECIFIC EMBODIMENTS

Figure 3:
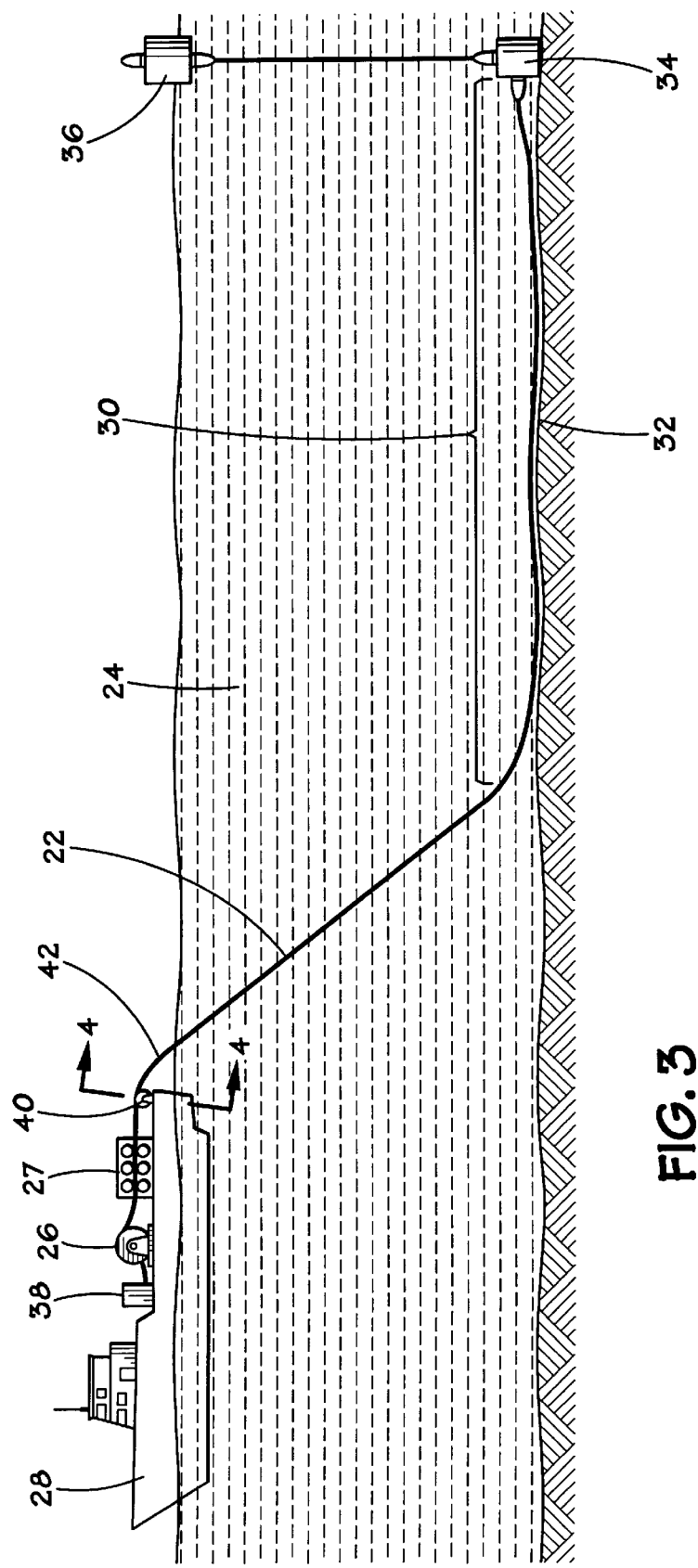
FIG. 3 is a side view of an exemplary embodiment of a variable buoyancy cable deployed from a ship in accordance with the present invention.

In the drawings described below, reference numerals are generally repeated where identical elements appear in more than one figure. FIG. 1 is a side view of a portion of an exemplary conventional seismic cable 10 that is deployed from a vessel 12. The cable 10 is deployed and retrieved from the vessel 12 with the aid of a linear cable engine 13 and a sheave 14 that is rotatably coupled to the vessel 12. Referring now also to FIG. 2, which is a sectional view of FIG. 1 taken at section 2—2, the cable 10 includes a flexible external jacket 16 that encloses a plurality of conductors 18. The conductors 18 are typically individually insulated conductor wires and cables, but also include such things as fiber optic cables and even fluid lines. The cable 10 undergoes significant tensile forces during deployment, retrieval and towing operations. Accordingly, a strength member 20, normally a wire rope or cable, is positioned inside the outer jacket 16 and nested among the conductors 18 along a central axis 21.

FIGS. 1 and 2 illustrate a couple of disadvantages associated with some conventional seismic cable designs. First, those conductors 18 positioned between the sheave 14 and the strength member 20 may be severely compressed and damaged by the strength member 20 as the cable 10 rolls through the cable engine 13 and across the sheave 14. The bending of the cable 10 over the sheave 14 in conjunction with the relatively high tensile loads on the cable 10 produces a flattening in the otherwise circular cross-section of the cable 10 and, more importantly, results in the strength member 20 compressing downwardly on those conductors 18 positioned nearest to the sheave 14. Those conductors 18 pinched by the strength member 16 and compressed against each other can be damaged.

Another drawback associated with the conventional cable 10 depicted in FIGS. 1 and 2 is fixed buoyancy. As noted above, without the ability to vary buoyancy, the cable 10 will normally be suitable for use only in a particular narrow set of ocean conditions. In circumstances where mission requirements change due to changing water conditions, weather or the nature of the seismic work to be performed, the conventional cable 10 will normally have to be withdrawn and replaced with another conventional cable better suited to the changed conditions.

Another disadvantage associated with the conventional cable 10 is the inability to compensate for the crushing effect of water pressure. Most conventional seismic cables are fabricated with a fixed crush depth. If the conventional cable 10 is deployed below the crush depth, the outer jacket 16 may be squeezed so tightly against the enclosed conductors 18 that the cable may fail. In circumstances where the seismic cable 10 may be moved through a variety of depths, such as in circumstances where an ROV is tethered to the cable, the maneuvering depth of ROV will be limited by the fixed crush depth of the cable 10. If relatively deep operations are anticipated, the cable 10 must be fitted with a very thick and often stiff outer sleeve 16 that can severely limit the maneuverability of the ROV and may still be unable to avoid crush if the design limit is exceeded.

FIG. 3 is a side view of an exemplary embodiment of a variable buoyancy cable 22 (hereinafter "cable 22") in accordance with the present invention. In this illustrative embodiment, the cable 22 is deployed into the ambient water 24 from a spool 26 by a cable engine 27 that are both positioned on a cable vessel 28. A segment 30 of the cable 22 is positioned on the ocean bottom 32. The distal end of the cable 22 is connected to an anchor 34, which may include various sensing equipment. The anchor 34 may, in turn, be coupled to a surface buoy 36, which may serve as a marker and also include surface sensing equipment. The proximal end of the cable 22 is coupled to a fluid supply 38. As described more fully below, the fluid supply 38 moves fluid into and out of the cable 22 to selectively affect the buoyancy thereof. The cable 22 is passed over a sheave 40 at the stern of the cable vessel 28, which results in a bend 42 in the cable 22 as shown.

Figure 4:
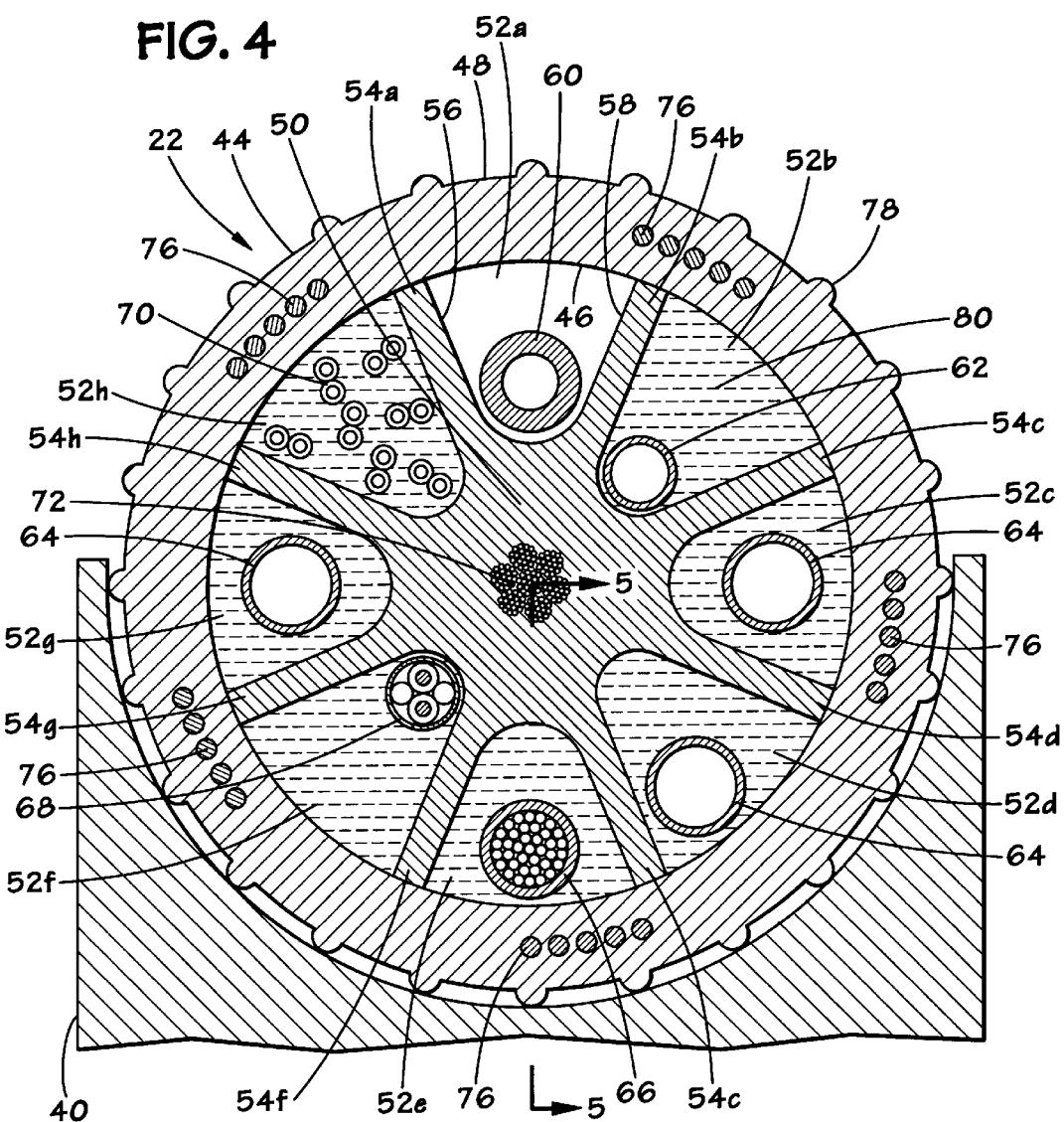
FIG. 4 is a sectional view of FIG. 3 taken at section 4—4 in accordance with the present invention.

The detailed structure of the cable 22 may be understood by referring now to FIG. 4, which is a cross-sectional view of the cable shown in FIG. 3 taken at section 4—4. The cable 22 includes a flexible tubular sleeve 44 that has an inner wall 46 and an outer wall 48. A core 50 is positioned inside the sleeve 44 and is provided with a plurality of longitudinally disposed external channels 52a, 52b, 52c, 52d, 52e, 52f, 52g and 52h. The channels 52a, 52b, 52c, 52d, 52e, 52f, 52g and 52h subdivide the core 50 into a plurality of circumferentially spaced splines 54a, 54b, 54c, 54d, 54e, 54f, 54g and 54h, which bear against the inner wall 46 of the sleeve 44. Each of the channels 52a, 52b, 52c, 52d, 52e, 52f, 52g and 52h has opposing sidewalls 56 and 58, although for simplicity of illustration, only the opposing sidewalls 56 and 58 for the channel 52a are called out.

The channels 52a, 52b, 52c, 52d, 52e, 52f, 52g and 52h are designed to receive various utility lines. The utility lines may consist of a variety of different types of lines for transmitting data, power, or fluids. The number, type and positioning of the utility lines within a given channel, is largely a matter of design discretion. In the illustrated embodiment, the utility lines consist of a high pressure line 60 positioned in the channel 52a, a low pressure line 62 positioned in the channel 52b, general purpose lines 64 positioned in the channels 52c, 52d and 52g, respectively, and an optic fiber cable 66 positioned in the channel 52e. In addition, a specialized conductor bundle 68 is positioned in the channel 52f and may consist of a twinaxial cable arrangement as shown. Finally, a plurality of paired conductors 70 are positioned in the channel 52h. Multiple channels 52a, 52b, 52c, 52d, 52e, 52f, 52g and 52h are depicted. However, the skilled artisan will appreciate that the core 50 may include a single channel.

The core 50 and splines 54a, 54b, 54c, 54d, 54e, 54f, 54g and 54h protect the utility lines 60, 62, 64, 66, 68 and 70 from being damaged by compression of the external sleeve 44 due to ambient water pressure or to interaction with the sheave 40 (See FIG. 3). During movement of the cable 22 past the sheave 40 and the tires of the cable engine 27, radially compressive loads are transferred from the jacket 44 to the splines 54a, 54b, 54c, 54d, 54e, 54f, 54g and 54h of the core 50, and not to the lines 60, 62, 64, 66, 68 and 70.

The core 50 is strengthened against tensile loads by a tension member 72 that is positioned approximately at the center of the core 50 and extends longitudinally along the length of the cable 22. The tension member 72 may be a synthetic fiber or metallic cable or wire rope.

Figure 5:
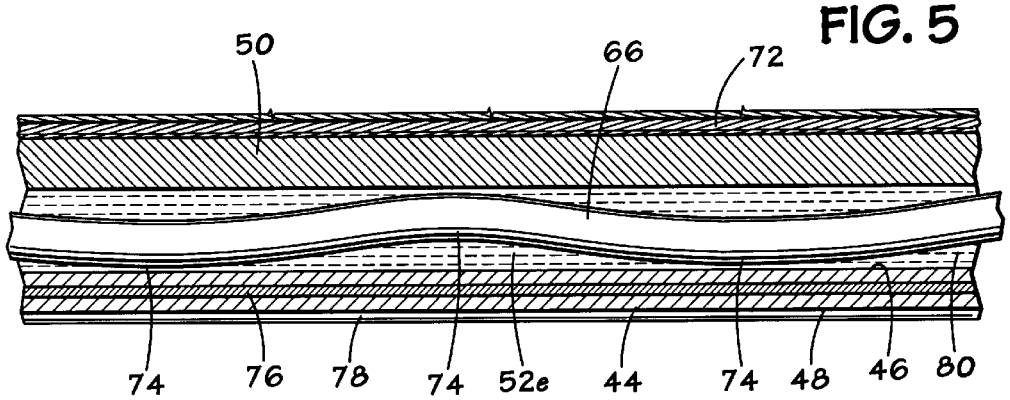
FIG. 5 is a sectional view of FIG. 4 taken at section 5—5.

As the skilled artisan will appreciate, the cable 22 may undergo substantial axial and bending strain during deployment. As the tensile strengths of the various utility lines 60, 62, 64, 66, 68 and 70 will be generally less than the tensile strength of the core 50 and the sleeve 44, it is desirable to configure the cable 22 so that substantial axial and bending strains imparted to the cable 22 will not result in the failure of one or more of the utility lines 60, 62, 64, 66, 68 and 70. In this regard, and as shown in FIG. 5, which is a sectional view of FIG. 4 taken at section 5—5, the utility lines 60, 62, 64, 66, 68 and 70 are positioned in their respective channels in a slackened condition. This is illustrated for the utility line 66 positioned in the channel 52e, but is also exemplary of the other utility lines 60, 62, 64, 68 and 70. In a slackened condition, the utility line 66 has a plurality of bends 74. The slackened condition of the utility lines 60, 62, 64, 66, 68 and 70 enables the cable 22, and specifically the core 50 and the sleeve 44 to undergo significant strain without failing the utility lines 60, 62, 64, 66, 68 and 70.

The tensile and bending strengths of the sleeve 44 may be enhanced by incorporating a plurality of circumferentially spaced tension members 76 positioned between the inner and outer walls 46 and 48 of the sleeve 44. The size, number and spacing of the tension members 76 are largely matters of design discretion. In addition, a plurality of circumferentially spaced ridges 78 may be molded into the outer wall 48 of the sleeve 44 to enhance traction with the cable engine 27 shown in FIG. 3.

Still referring to FIGS. 4 and 5, the buoyancy of the cable 22 is selectively variable by way of the selective movement of a fluid, represented by the dashed lines and designated 80, into and out of the cable 22. In this regard, each of the channels 52a, 52b, 52c, 52d, 52e, 52f, 52g and 52h, in conjunction with the inner wall 46 of the sleeve 44, define respective flow passages for holding the fluid 80. The fluid 80 is introduced into the flow passages by the fluid supply 38 depicted in FIG. 3. The fluid 80 may be introduced into all of the flow passages uniformly or to selective flow passages, such as the passages defined by the channels 52b, 52c, 52d, 52e, 52f, 52g and 52h in FIG. 4. The fluid 80 may be selected to have a specific gravity that provides the cable 22 with either a positive buoyancy, a neutral buoyancy or a negative buoyancy relative to the ambient water 24. In this way, the buoyancy of the cable 22 can be controlled, both by preselecting a desired specific gravity for the fluid 80 and by selectively introducing the fluid 80 into one or more of the passages defined by the channels 52a, 52b, 52c, 52d, 52e, 52f, 52g and 52h.For example, the submergence of the cable 22 depicted in FIG. 3 may be accomplished by either introducing a fluid 80 with a specific gravity that initiates a negative buoyancy of the cable 22 uniformly into all of the passages defined by the channels 52a, 52b, 52c, 52d, 52e, 52f, 52g and 52h or, dependent upon the specific gravity of the fluid 80, into only select of the flow passages. If it is desired to increase the buoyancy of the cable 22, and therefore move the cable 22 from the ocean bottom 32, a fluid 80 having a lower specific gravity than the ambient water 24 may be introduced into the cable 22, or a sufficient amount of the existing fluid 80 with a greater specific gravity than the ambient water 24 may be removed from the cable 22 or both.

A variety of fluids may be used, such as, for example, various oils, solvents, gases or gaseous mixtures, or the like. Fluorinert® and Varsol® represent just two examples of suitable solvents. Note that if the fluid 80 is an oil, the fluid 80 will provide a lubrication of any relative sliding movement between the various utility lines 60, 62, 64, 66, 68 and 70 and the respective surfaces of the channels 52*a*, 52*b*, 52*c*, 52*d*, 52*e*, 52*f*, 52*g* and 52*h*.

An alternate exemplary embodiment of the variable buoyancy cable, now designated 22', may be understood by referring now to FIGS. 6 and 7. FIG. 6 is a sectional view like FIG. 4 and FIG. 7 is a sectional view of FIG. 6 taken at section 7—7. In this illustrative embodiment, the buoyancy-effecting fluid, now designated 80', contains a particulate, represented by the small circles, that aids in affecting the buoyancy of the cable 22'. The particulates may be composed of a material that will decrease the buoyancy of the cable 22' when the fluid 80' is introduced into the cable 22' or, alternatively, of a material with a density that will increase the buoyancy of the cable 22' when the fluid 80' is introduced into the cable 22'. For example, glass or light plastic particles or other light particles which do not absorb the fluid 80' may be used to increase the buoyancy of the cable 22'. Conversely, a more high density particulate, such as a fine powder with a lubricious mud-like effect may be used to decrease the buoyancy of the cable 22'. In either case, the particulates may be substantially spherical or irregular in shape. It is anticipated that various molecular forms and conglomerate forms of particulate may be employed depending upon the buoyancy conditions desired.

The embodiment depicted in FIGS. 6 and 7 also illustrates that the depth of the channels, now designated 52*a*', 52*b*', 52*c*', 52*d*', 52*e*', 52*f*', 52*g*' and 52*h*' may vary along the length of the core, now designated 50'. The variation in the depth of the channels 52*a*', 52*b*', 52*c*', 52*d*', 52*e*', 52*f*', 52*g*' and 52*h*' may be periodic as shown in FIG. 7 or be random as desired. A variable depth channel provides additional space to accommodate even more excess slack of the utility lines 60, 62, 64, 66, 68 and 70 than would be possible using the relatively constant depth channels depicted in FIGS. 4 and 5.

Figure 8:
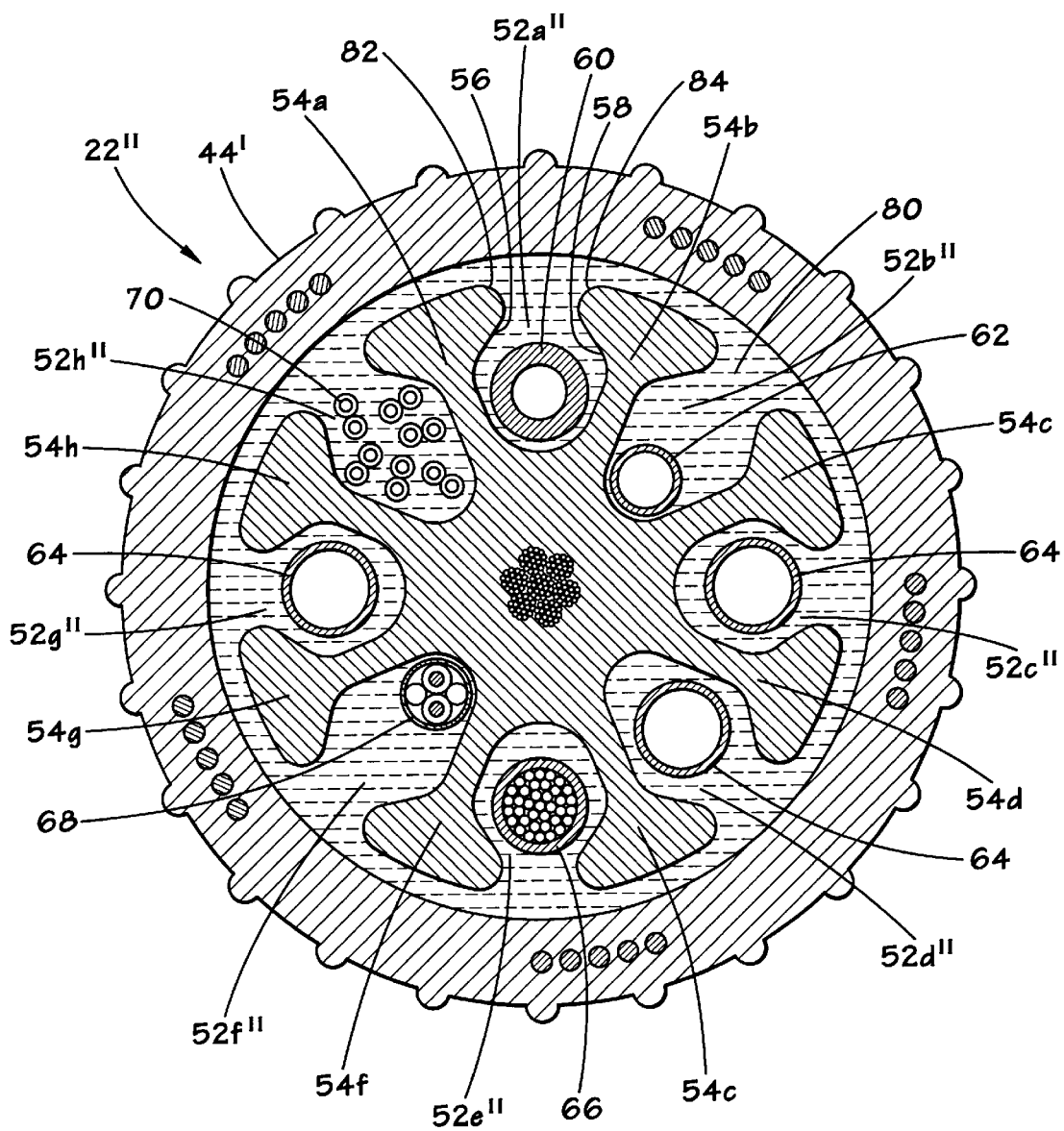
FIG. 8 is a sectional view like FIG. 4 of another alternate embodiment of the variable buoyancy cable in accordance with the present invention.

Another alternate embodiment of the cable, now designated 22", is illustrated in FIG. 8, which is a sectional view like FIG. 4. Here, the sleeve, now designated 44', may be provided with sufficient radial elasticity such that the buoyancy-affecting fluid 80 can cause the sleeve 44' to expand in diameter when the fluid 80 is introduced under pressure. In this way, a larger volume of the fluid 80 may be introduced into the cable 22' to increase or decrease the buoyancy thereof as desired. This capability is useful where high ambient water pressure is anticipated and it is desired to balance internal pressure against external pressure to prevent the outer sleeve 44' from collapsing against the core 50 and potentially damaging the utility lines 60, 62, 64, 66, 68 and 70. FIG. 8 shows the sleeve 44' in the fully expanded position. If the pressure of the fluid 80 is reduced, the sleeve 44' will contract radially.

Still referring to FIG. 8, it is desirable to prevent the various utility lines 60, 62, 64, 66, 68 and 70 from moving radially out of their respective channels, now designated 52*a*'–52*h*' while the sleeve 44' is out of physical contact with the splines 54*a*, 54*b*, 54*c*, 54*d*, 54*e*, 54*f*, 54*g* and 54*h*. In this regard, the opposing sidewalls 56 and 58 of the channels 52*a*'–52*h*' are provided with respective ears 82 and 84 that project into the channels 52*a*'–52*h*' as shown. For simplicity of illustration, only the ears 82 and 84 for the channel 52*a*' are called out. The ears 82 and 84 are provided with a spacing that is slightly smaller than the anticipated diameter of the given utility line that will be placed in a given channel. In this way, a given utility line may be snapped past the ears 82 and 84 and into a given channel. The ears 82 and 84 prevent the utility lines 60, 62, 64, 66, 68 and 70 from migrating out of their respective channels 52*a*'–52*h*' and becoming potentially crushed between the sleeve 44' and one or more of the splines 54*a*, 54*b*, 54*c*, 54*d*, 54*e*, 54*f*, 54*g* and 54*h* when the sleeve 44' returns to its contracted position. The ears 82 and 84 may be incorporated into any of the embodiments disclosed herein.

Figure 9:
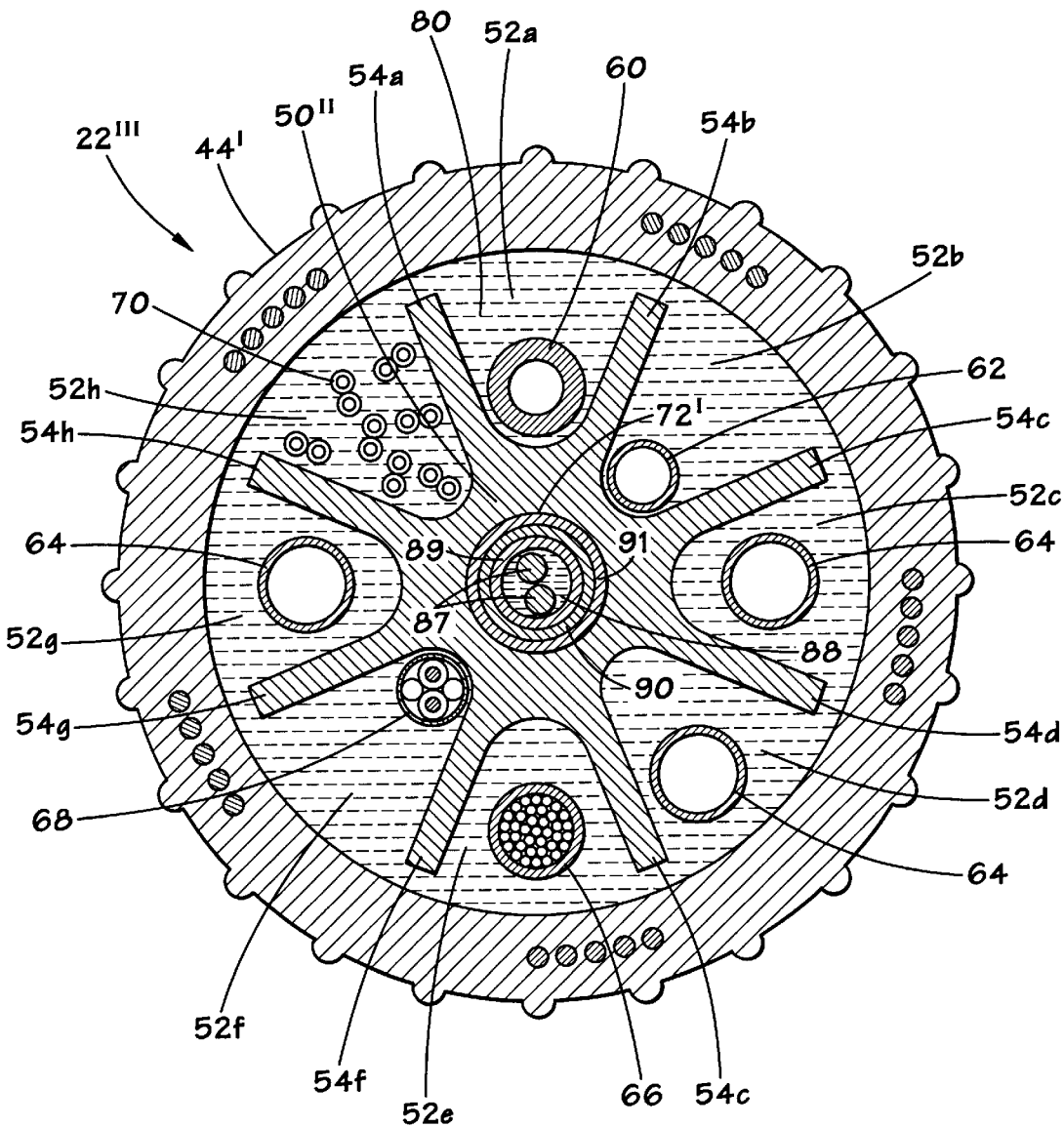
FIG. 9 is a sectional view like FIG. 4 of another alternate exemplary embodiment of the variable buoyancy cable in accordance with the present invention.

Another alternate embodiment of the cable, now designated 22''', may be understood by referring now to FIG. 9, which is a sectional view like FIG. 4. In this exemplary embodiment, the strength member, now designated 72', includes a strength tube 86 that encloses utility lines 87 and a quantity of pressurized fluid 88. The strength 86 tube may be include an inner insulating sleeve 89, a reinforcing tube 90 fabricated from high strength composite materials, such as carbon, aramid, polyester fibers or the like, and an outer protective sleeve 91. The quantity of pressurized fluid 88 provides enhanced protection of the enclosed utility lines 87 from damaging radial compression by the core, now designated 50". Optionally, the tube 86 may be unitary in construction.

Figure 10:
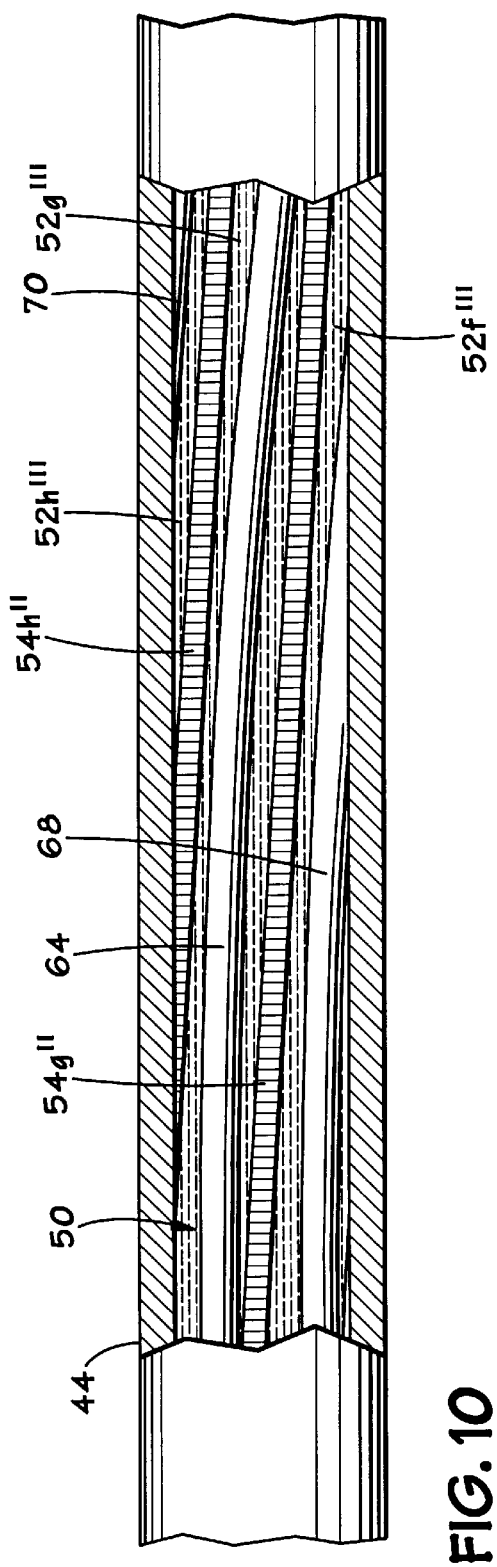
FIG. 10 is a side view of an exemplary embodiment of the cable with a portion peeled away to reveal helical channels in accordance with the present invention.

In the foregoing embodiments, the channels of the cable cores 50, 50' and 50" are substantially linear. However, the channels 52*a*, 52*b*, 52*c*, 52*d*, 52*e*, 52*f*, 52*g* and 52*h* for any of the embodiments disclosed herein need not be linear. For example, as illustrated in FIG. 10, which is a side view similar to FIG. 5 with a portion of the sleeve 44 peeled away, the channels, now designated 52*f*''', 52*g*''' and 52*h*''', as well as the remaining channels which are not visible in FIG. 10, may be helical. With helical channels 52*a*''', 52*b*''', 52*c*''', 52*d*''', 52*e*''', 52*f*''', 52*g*''' and 52*h*''', the corresponding helically configured splines, now designated 54*a*", 54*b*", 54*c*", 54*d*", 54*e*", 54*f*", 54*g*" and 54*h*", provide enhanced protection for the utility lines 60, 62, 64, 66, 68 and 70 caused by the sleeve 44 squeezing against the core 50, particularly during severe bending movements under loads such as those that occur when the cable 22 undergoes the bend 42 shown in FIG. 3 and is drawn onto the spool 26. With helical splines 54*a*", 54*b*", 54*c*", 54*d*", 54*e*", 54*f*", 54*g*" and 54*h*", as the cable 22 is bent, the helical nature of the splines 54*a*", 54*b*", 54*c*", 54*d*", 54*e*", 54*f*", 54*g*" and 54*h*" will cause the core 50 to bend without substantial buckling of any splines 54*a*", 54*b*", 54*c*", 54*d*", 54*e*", 54*f*", 54*g*" and 54*h*" in the core 50.

Figure 11:
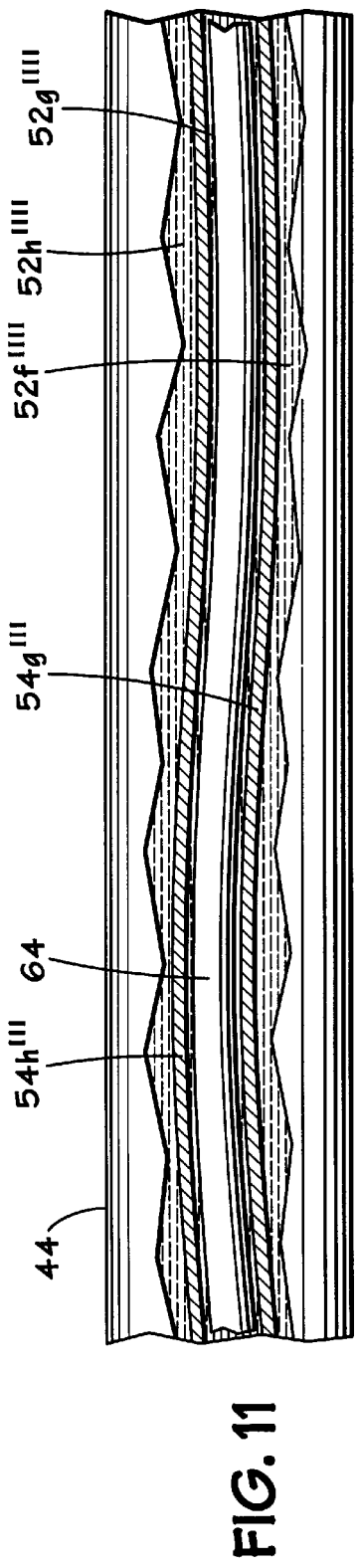
FIG. 11 is a side view like FIG. 10 depicting another exemplary embodiment of the variable buoyancy cable incorporating oscillating channels in accordance with the present invention.

Another alternate embodiment incorporating nonlinear channels may be understood by referring now to FIG. 11, which is a side view like FIG. 10. In this illustrative embodiment, the channels, now designated 52*a*'''', 52*b*'''', 52*c*'''', 52*d*'''', 52*e*'''', 52*f*'''', 52*g*'''' and 52*h*'''' (note that only 52*f*'''', 52*g*'''' and 52*h*'''' are visible) and thus the corresponding splines, now designated 54*a*''', 54*b*''', 54*c*''', 54*d*''', 54*e*''', 54*f*''', 54*g*''' and 54*h*''', (note that only splines 54*g*''' and 54*h*''' are visible), follow a substantially oscillating path along the length of the core 50.

Figure 12:
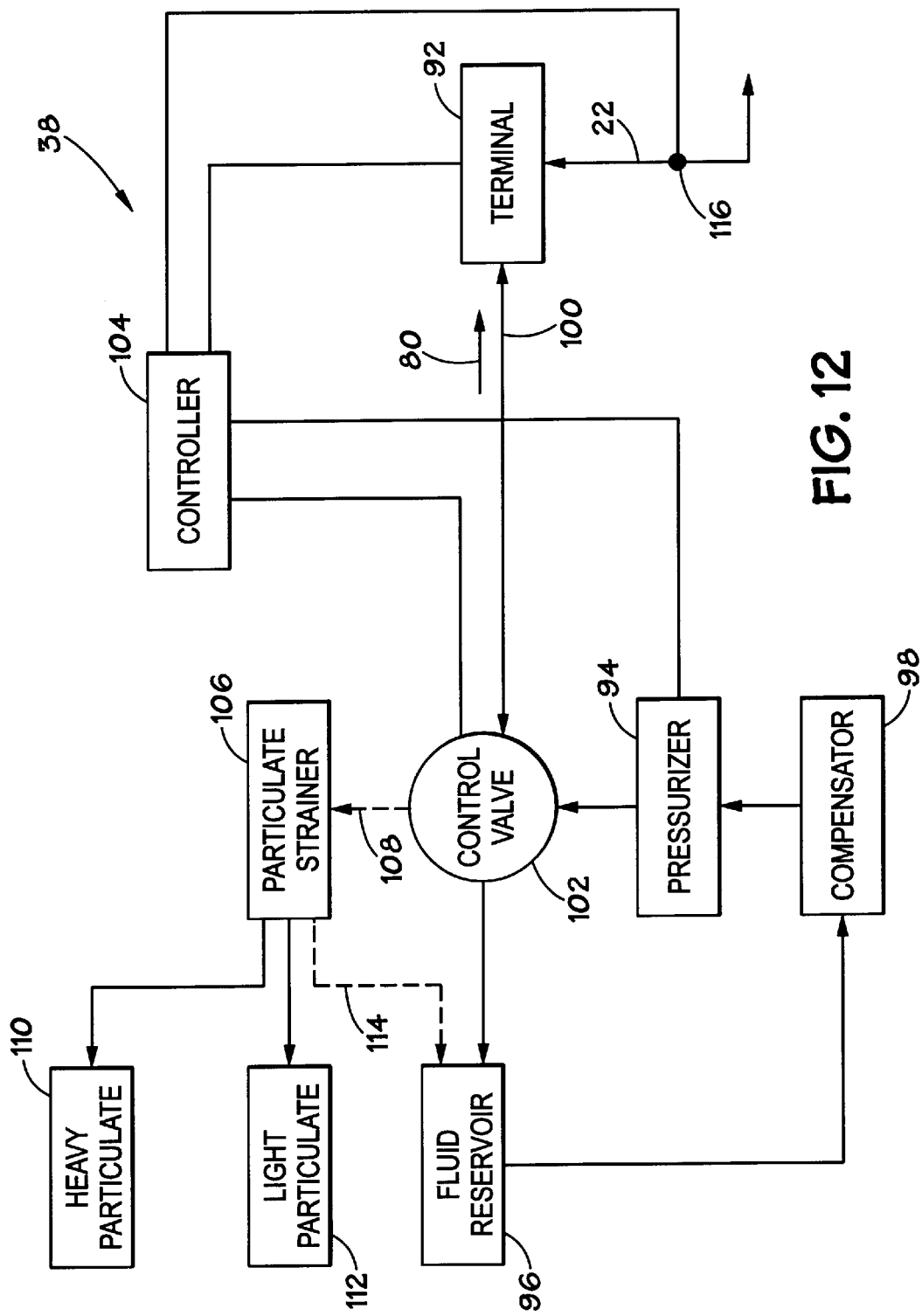
FIG. 12 is a block diagram of an exemplary embodiment of a fluid supply for the variable buoyancy cable in accordance with the present invention.

An exemplary embodiment of the fluid supply 38 may be understood by referring now to FIG. 12, which is a simplified block diagram. A terminal 92 is provided for providing an interface between the cable 22 and the fluid supply 38 and for selectively deploying and retrieving the cable 22. The pressurized fluid 80 used to affect the buoyancy of the cable 22 is delivered by a pressurizer 94 that draws the fluid 80 from a fluid reservoir 96 and temporarily stores the fluid 80 in a pressure compensator 98. Fluid 80 is transmitted from the pressurizer 94 to the terminal 92 via a supply line 100. The flow of fluid 80 in the supply line 100 is controlled by a control valve 102 that is connected to the pressurizer 94 and to the fluid reservoir 96. The control valve 102 is, in turn, connected to and controlled by a controller 104 that not only controls the movements of the control valve 102, but also controls the deployment and retraction of the cable 22 by the terminal 92 and the input and output of the various utility lines in the cable 22 (see FIG. 4). If the fluid 80 is mixed with a particulate, the fluid supply 38 may be optionally provided with a particulate strainer 106 that may be selectively connected to the control valve 102 as indicated by the dashed arrow 108. The output of the particulate strainer 106 may be coupled to a heavy particulate reservoir 110 and a light particulate reservoir 112 where heavy particulates and/or light particulates may be stored, as the case may be, and the fluid component of the particulate and fluid mixture may be routed back to the fluid reservoir 96 as indicated by the dashed arrow 114.

The operation of the fluid supply 38 will now be described. Assume for the purpose of this illustration that it is desired to deliver fluid 80 to the cable 22 to increase the buoyancy thereof. In this case, the fluid 80 will have a density less than the ambient water. The pressurizer 94 and the control valve 102 are activated by the controller 104, enabling pressurized fluid 80 to flow through the supply line at 100 and into the cable 22. As the fluid 80 flows into the cable 22, the buoyancy thereof increases and the cable 22 will move upward in the water. The process may be reversed to remove the fluid 80 from the cable 22 and decrease the buoyancy thereof. The control valve 102 is activated by the controller 104 to dump fluid 80 directly into the fluid reservoir 96.

Figure 13:
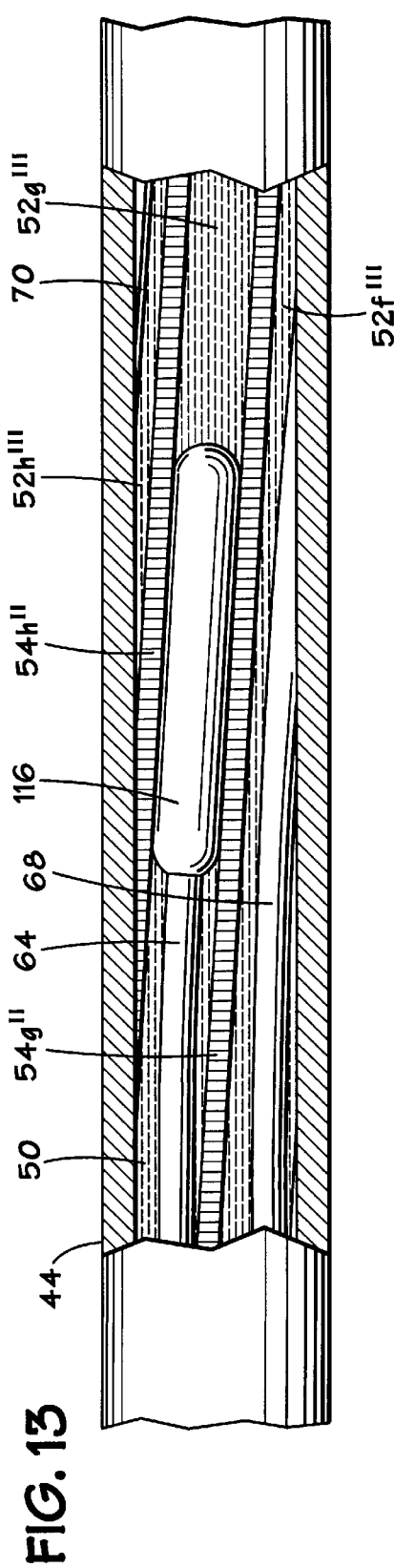
FIG. 13 is a side view like FIG. 10 depicting another exemplary embodiment of the cable incorporating sensors in accordance with the present invention.

One or more sensors 116 may be positioned in the cable 22 and the outputs thereof may be monitored by the controller 104. The sensors 116 may be pressure transducers, hydrophones, or other types of sensing instruments. The pressure of the fluid 80 inside the cable 22 may be used as an indicator of the buoyancy of the cable 22 at a given instant. This type of data may be useful in determining the depth of the cable 22 as well as an indication of a potential pressure induced failure of the cable 22. An exemplary depiction of the incorporation of sensors 116 into the cable is illustrated in FIG. 13, which is a cutaway side like FIG. 10. Here, the sensor 116 is nested in the channel 52g'" and coupled to a utility line 64. The sensor 116 is protected from radial compressive loads by the core 50 in the same manner as described above in reference to the various utility lines. Furthermore, the cable 22 may incorporate sensors 116 yet retain an isodiametric character, that is, a relatively constant outer diameter. This configuration eliminates the protrusions associated with conventional cable connections to sensors, which can be damaged during movement past ship-based equipment.

Figure 14:
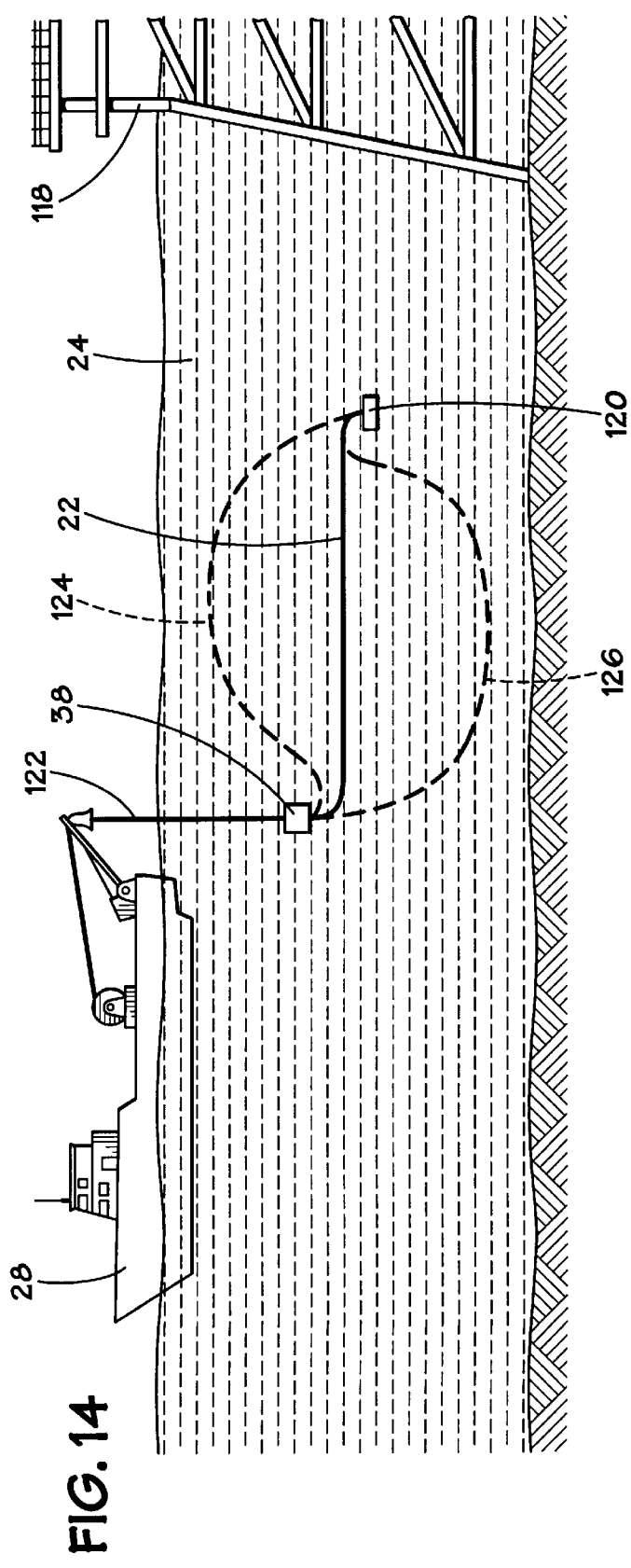
FIG. 14 is a side view like FIG. 3, but depicts an exemplary embodiment of the variable buoyancy cable deployed with a remotely operated vehicle in accordance with the present invention.

FIG. 3 described above illustrates the deployment of the cable 22 on the ocean bottom 32. However, other deployment schemes are contemplated by the present invention. For example, FIG. 14 depicts the cable 22 deployed near an offshore oil platform 118. One end of the cable 22 is coupled to the fluid supply 38 housed in a submersible module and the other end is coupled to a subsea apparatus 120, which may be an ROV or other type of subsea apparatus. The fluid supply 38 is suspended from the ship 28 to a working depth by a tether 122. In this embodiment, the cable 22 can be selectively moved from the neutral buoyancy position shown, to positions of positive buoyancy relative to the ROV 120 as indicated by the dashed line 124, or negative buoyancy relative to the ROV 120 as indicated by the dashed line 126.

Another alternate embodiment in accordance with the present invention is depicted in FIG. 15. In this exemplary embodiment, the cable 22 is subdivided into segments 128, 130 and 132 which are coupled to respective fluid supplies 38. The fluid supplies 38 may be selectively manipulated to position the segment 128 at a relatively shallow depth, the segment 130 at an intermediate depth, and the segment 132 between a relatively deep position indicated by the dashed line 134 and a more intermediate depth as shown. Optionally, one end of the segment 128 may be coupled to a land base 134, which may serve as an anchor, a data relay and a fluid supply. In addition, a control buoy 136 may be optionally coupled to one of the fluid supplies 38.

In another alternate embodiment in accordance with the present invention depicted in FIG. 16, the cable 22 may be positioned on the ocean bottom 32 and coupled between two land bases 134, one or both of which may function as the aforementioned fluid supply 38 for selectively manipulating the buoyancy of the cable 22. The cable 22 in accordance with the present invention enables the positioning on an ocean bottom 32 at a preselected depth, even in areas where the actual ocean bottom terrain is variable in depth as indicated in FIG. 16.

The skilled artisan will appreciate that the features of the above-described exemplary embodiments may be incorporated into one another to produce a myriad of combinations. For example, the helical channels described in conjunction with FIG. 10 or the alternative strength member 72' described in conjunction with FIG. 9 may be incorporated into any of the above-described embodiments. Other examples are legion.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A variable buoyancy cable, comprising:
   a flexible sleeve having an inner wall and an outer wall;
   a core positioned in the sleeve and having at least two longitudinally disposed outwardly projecting splines, the at least two splines being circumferentially spaced apart to define at least one external channel, the at least one external channel and the inner wall of the flexible sleeve defining at least one fluid passage for receiving a fluid to affect the buoyancy of the variable buoyancy cable;
   a slackened utility line positioned in the at least one external channel; and
   a fluid supply coupled to the flexible sleeve and being operable to move fluid into and out of the at least one fluid passage to selectively affect the buoyancy of the variable buoyancy cable.

2. The variable buoyancy cable of claim 1, wherein the at least one external channel is substantially linear.

3. The variable buoyancy cable of claim 1, wherein the at least one external channel is substantially helical.

4. The variable buoyancy cable of claim 1, wherein the depth of the at least one external channel varies along the length of the core.

5. The variable buoyancy cable of claim 4, wherein the variation in depth is periodic.

6. The variable buoyancy cable of claim 1, wherein the at least one external channel is substantially oscillating.

7. The variable buoyancy cable of claim 1, comprising a tension member positioned in the core.

8. The variable buoyancy cable of claim 7, wherein the tension member comprises a metal cable.

9. The variable buoyancy cable of claim 7, wherein the tension member comprises a synthetic fiber rope.

10. The variable buoyancy cable of claim 7, wherein the tension member comprises a tube having a substantially sealed lumen for receiving a transmission line and a quantity of a pressure compensating fluid.

11. The variable buoyancy cable of claim 10, wherein the tube comprises a carbon reinforced material.

12. The variable buoyancy cable of claim 1, comprising a plurality of peripherally spaced-apart tension members positioned in the sleeve between the outer and inner walls.

13. The variable buoyancy cable of claim 1, wherein sleeve is expandable in diameter when the pressure of the fluid is raised above a preselected level.

14. The variable buoyancy cable of claim 1, wherein the fluid contains a particulate that decreases the density of the fluid.

15. The variable buoyancy cable of claim 1, wherein the fluid contains a particulate that increases the density of the fluid.

16. The variable buoyancy cable of claim 1, wherein the fluid supply comprises a regulator for controlling the buoyancy of the variable buoyancy cable by controlling the movement of fluid into and out of the variable buoyancy cable.

17. The variable buoyancy cable of claim 16, wherein the regulator comprises a compensator, a pressurizer and a supply valve.

18. The variable buoyancy cable of claim 1, comprising a sensor positioned in the channel.

19. The variable buoyancy cable of claim 1, comprising a first ear projecting into the at least one external channel and a second ear projecting into the at least one external channel in opposition to the first ear to prevent at least one of the plurality of utility lines from moving radially out of the at least one external channel, the first ear and the second being respectively coupled to the at least two outwardly projecting splines defining the at least one external channel.

20. A variable buoyancy cable, comprising:
 a flexible sleeve having an inner wall and an outer wall;
 a core positioned in the sleeve and having a plurality of longitudinally disposed outwardly projecting splines, the plurality of splines being circumferentially spaced apart to define a plurality of external channels, the plurality of external channels and the inner wall of the flexible sleeve defining a plurality of fluid passages for receiving a fluid to affect the buoyancy of the variable buoyancy cable;
 a plurality of slackened utility lines positioned in select of the plurality of external channels; and
 a fluid supply coupled to the flexible sleeve and being operable to move fluid into and out of the plurality of fluid passages to selectively affect the buoyancy of the variable buoyancy cable.

21. The variable buoyancy cable of claim 20, wherein the external channels are substantially linear.

22. The variable buoyancy cable of claim 20, wherein the external channels are substantially helical.

23. The variable buoyancy cable of claim 20, wherein the depths of the external channels vary along the length of the core.

24. The variable buoyancy cable of claim 23, wherein the variations in depth are periodic.

25. The variable buoyancy cable of claim 20, wherein the external channels are substantially oscillating.

26. The variable buoyancy cable of claim 20, comprising a tension member positioned in the core.

27. The variable buoyancy cable of claim 26, wherein the tension member comprises a metal cable.

28. The variable buoyancy cable of claim 26, wherein the tension member comprises a synthetic fiber rope.

29. The variable buoyancy cable of claim 26, wherein the tension member comprises a tube having a substantially sealed lumen for receiving a transmission line and a quantity of a pressure compensating fluid.

30. The variable buoyancy cable of claim 29, wherein the tube comprises a carbon reinforced material.

31. The variable buoyancy cable of claim 20, comprising a plurality of peripherally spaced-apart tension members positioned in the sleeve between the outer and inner walls.

32. The variable buoyancy cable of claim 19, wherein the sleeve is expandable in diameter when the pressure of the fluid is raised above a preselected level.

33. The variable buoyancy cable of claim 19, wherein the fluid contains a particulate that decreases the density of the fluid.

34. The variable buoyancy cable of claim 19, wherein the fluid contains a particulate that increases the density of the fluid.

35. The variable buoyancy cable of claim 19, wherein the fluid supply comprises a regulator for controlling the buoyancy of the variable buoyancy cable by controlling the movement of fluid into and out of the variable buoyancy cable.

36. The variable buoyancy cable of claim 35, wherein the regulator comprises a compensator, a pressurizer and a supply valve.

37. The variable buoyancy cable of claim 20, comprising a sensor positioned in one of the plurality of channels.

38. The variable buoyancy cable of claim 20, a first ear projecting into at least one of the plurality of external channels and a second ear projecting into the at least one of the plurality of external channels in opposition to the first ear to prevent at least one of the plurality of utility lines from moving radially out of the at least one of the plurality of external channels, the first ear and the second being respectively coupled to two of the plurality of outwardly projecting splines defining the at least one of the plurality of external channels.

39. A variable buoyancy cable, comprising:
 a flexible sleeve having an inner wall and an outer wall;
 a core positioned in the sleeve and having a plurality of outwardly protecting splines, the plurality of splines being circumferentially spaced apart to define a plurality of helical external channels, the plurality of helical external channels and the inner wall of the flexible sleeve defining a plurality of fluid passages for receiving a fluid to affect the buoyancy of the variable buoyancy cable;
 a plurality of slackened utility lines positioned in select of the plurality of helical external channels; and
 a fluid supply coupled to the flexible sleeve and being operable to move fluid into and out of the fluid passages to selectively affect the buoyancy of the variable buoyancy cable.

40. The variable buoyancy cable of claim 39, comprising a tension member positioned in the core.

41. The variable buoyancy cable of claim 40, wherein the tension member comprises a metal cable.

42. The variable buoyancy cable of claim 40, wherein the tension member comprises a synthetic fiber rope.

43. The variable buoyancy cable of claim 40, wherein the tension member comprises a tube having a substantially sealed lumen for receiving a transmission line and a quantity of a pressure compensating fluid.

44. The variable buoyancy cable of claim 43, wherein the tube comprises a carbon reinforced material.

45. The variable buoyancy cable of claim 39, comprising a plurality of peripherally spaced-apart tension members positioned in the sleeve between the outer and inner walls.

46. The variable buoyancy cable of claim 39, wherein the sleeve is expandable in diameter when the pressure of the fluid is raised above a preselected level.

47. The variable buoyancy cable of claim 39, wherein the fluid contains a particulate that decreases the density of the fluid.

48. The variable buoyancy cable of claim 39, wherein the fluid contains a particulate that increases the density of the fluid.

49. The variable buoyancy cable of claim 39, wherein the fluid supply comprises a regulator for controlling the buoyancy of the variable buoyancy cable by controlling the movement of fluid into and out of the variable buoyancy cable.

50. The variable buoyancy cable of claim 49, wherein the regulator comprises a compensator, a pressurizer and a supply valve.

51. The variable buoyancy cable of claim 39, comprising a sensor positioned in one of the plurality of helical channels.

52. The variable buoyancy cable of claim 39, a first ear projecting into at least one of the plurality of helical external channels and a second ear projecting into the at least one of the plurality of helical external channels in opposition to the first ear to prevent at least one of the plurality of utility lines from moving radially out of the at least one of the plurality of helical external channels, the first ear and the second being respectively coupled to two of the plurality of outwardly projecting splines defining the at least one of the plurality of helical external channels.

* * * * *